US008898348B2

(12) United States Patent
Minoo et al.

(10) Patent No.: US 8,898,348 B2
(45) Date of Patent: Nov. 25, 2014

(54) METHOD AND SYSTEM FOR DETECTING CONNECTION OF A HOST DEVICE TO AN ACCESSORY DEVICE

(71) Applicant: Apple Inc., Cupertino, CA (US)

(72) Inventors: Jahan Minoo, San Jose, CA (US); Zachary Rich, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/762,227

(22) Filed: Feb. 7, 2013

(65) Prior Publication Data

US 2014/0223037 A1 Aug. 7, 2014

(51) Int. Cl.
G06F 3/00 (2006.01)
H02J 7/00 (2006.01)
G06F 11/30 (2006.01)
G06F 1/16 (2006.01)
H04M 1/725 (2006.01)

(52) U.S. Cl.
CPC .......... *G06F 11/3051* (2013.01); *G06F 1/1632* (2013.01); *H02J 7/0036* (2013.01); *H04M 1/72527* (2013.01)
USPC ............................................. 710/16; 320/107

(58) Field of Classification Search
CPC ..................... G06F 2213/0042; G06F 13/4081; G06F 1/266
See application file for complete search history.

(56) References Cited

U.S. PATENT DOCUMENTS

| 6,131,134 A * | 10/2000 | Huang et al. ................... 710/302 |
| 6,161,027 A | 12/2000 | Poirel |
| 2010/0228892 A1 | 9/2010 | Chang |
| 2013/0049680 A1 * | 2/2013 | Katsumata ..................... 320/107 |

FOREIGN PATENT DOCUMENTS

| EP | 1542438 A1 | 6/2005 |
| WO | 2005/022874 A1 | 3/2005 |

OTHER PUBLICATIONS

International Search Report and Written Opinion for International PCT Application No. PCT/US2014/014451, mailed May 8, 2014, 12 pages.

\* cited by examiner

*Primary Examiner* — Hyun Nam
(74) *Attorney, Agent, or Firm* — Kilpatrick Townsend & Stockton LLP

(57) ABSTRACT

Techniques for detecting connection of a host device by an accessory device are provided. The accessory device outputs a pulsed voltage/current on its power contact and measure the voltage at the power contact in response to the pulsed voltage/current. If the measured voltage reaches a certain value at or after the expiration of a predetermined time, then the accessory concludes that a host device is connected to it.

24 Claims, 11 Drawing Sheets

| ACC1 | Data A+ | Data A- | P_IN | P_IN | Data B- | Data B+ | ACC2 |
|------|---------|---------|------|------|---------|---------|------|
| *306(1)* | *306(2)* | *306(3)* | *306(4)* | *306(5)* | *306(6)* | *306(7)* | *306(8)* |

| GND | Data A+ | Data A- | ACC1 | P_IN | Data B- | Data B+ | ACC2 |
|-----|---------|---------|------|------|---------|---------|------|
| *306(1)* | *306(2)* | *306(3)* | *306(4)* | *306(5)* | *306(6)* | *306(7)* | *306(8)* |

METHOD AND SYSTEM FOR DETECTING CONNECTION OF A HOST DEVICE TO AN ACCESSORY DEVICE

BACKGROUND

Interoprabilty between devices is one of the hallmarks of modern electronic devices. There are many instances where two devices need to work in conjunction with each other to accomplish a particular task. For instance, if a portable electronic device is to be charged, an appropriate power supply is needed that can connect with the electronic device and provide the requisite power to charge the electronic device.

Also, often it may be useful to ensure that the two or more devices are connected together before exchanging signals. This may be needed to ensure safety and/or security for the devices involved.

BRIEF DESCRIPTION OF THE DRAWINGS

FIG. 3B is a cross-sectional view of the receptacle connector according to an embodiment of the present invention.

DETAILED DESCRIPTION

Figure 1:
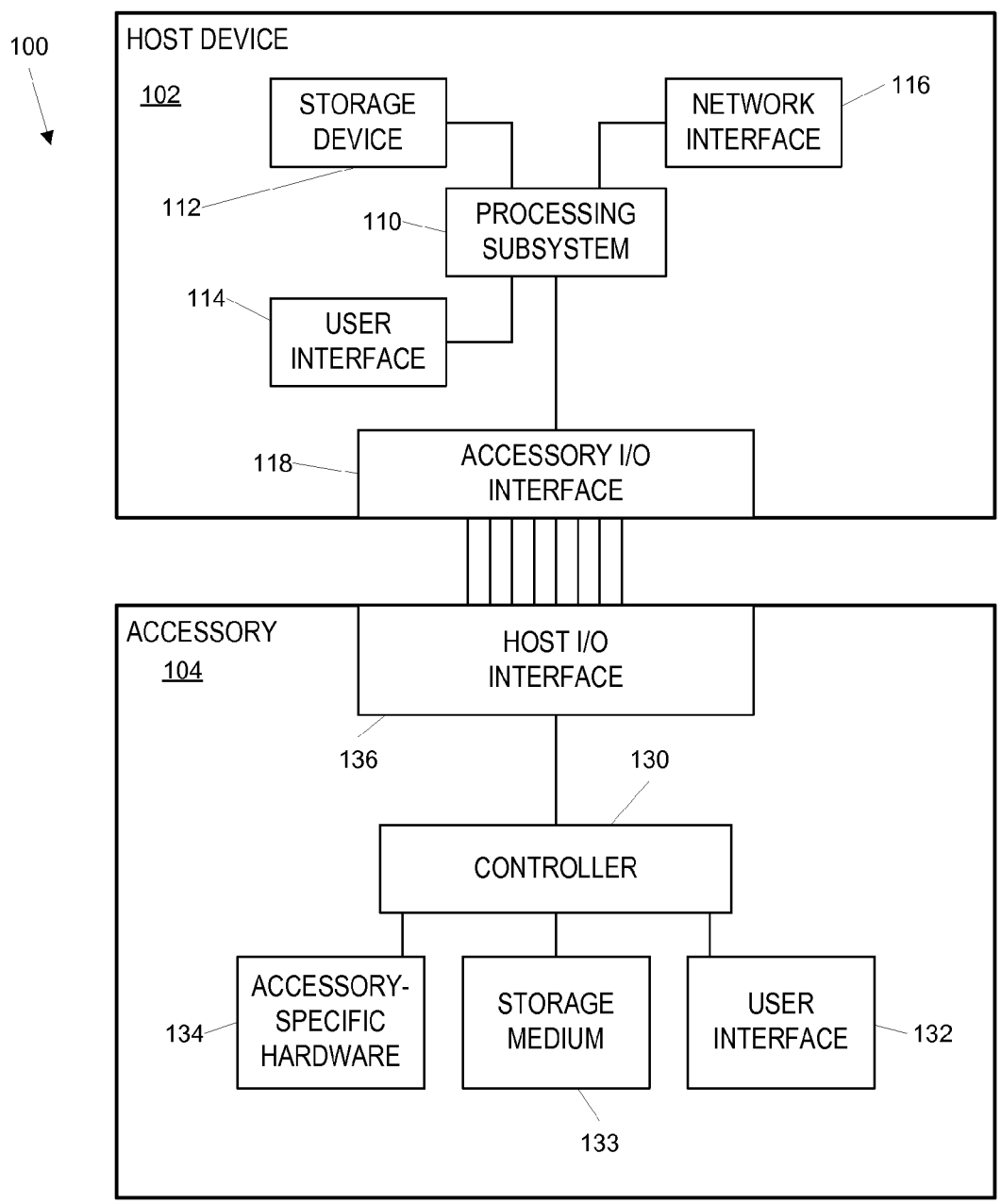
FIG. 1 is a functional block diagram of a host device and an accessory device according to an embodiment of the present invention.

The present disclosure generally relates to an electronic device and an accessory device that is designed to operate with the electronic device. More specifically, embodiments of the present invention provide techniques for the accessory device to detect connection with the electronic device when the electronic device is powered down or has a dead battery.

Some embodiments of the present invention provide a method for detecting connection of an host device to an accessory device. The method includes the accessory device outputting a first current over a contact in an accessory connector. The method further includes the accessory device measuring a voltage as function of time at the contact and determining whether the measured voltage at the contact reaches or exceeds a threshold voltage prior to, at, or after expiration of a predetermined time. If the measured voltage meets or exceeds the threshold voltage prior to expiration of the predetermined time the accessory device concludes that a host device is not connected to the accessory and if the measured voltage meets or exceeds the threshold voltage at or after expiration of the predetermined time the accessory device concludes that the host device is connected to the accessory.

Some embodiments of the present invention provide an accessory device that has a first connector including a plurality of contacts. The first connector can be adapted to connect with a second connector of a host device. In this instance, the host device has no power and hence cannot communicate with the accessory device to indicate its presence. The accessory device also includes detection circuitry that is coupled to the first connector and a current source that is coupled to a first contact in the plurality of contacts and can provide a first current over the first contact. The accessory device can output the first current over the first contact, measure, using the detection circuitry, a rate of rise of voltage at the first contact, determine that the voltage measured at the first contact meets or exceeds a threshold voltage at or after expiration of a predetermined time, and based on the determination, conclude that the host device is connected to the accessory device. The accessory device can then communicate with the host device to authenticate the accessory device.

Other embodiments of the present invention provide a computer-readable storage device in an accessory device that includes a plurality of instructions. The plurality of instructions include instructions that cause the accessory device to output a first current over a contact of an accessory connector of the accessory device, instructions that cause the accessory device to measure a voltage at the contact as a function of time, instructions that cause the accessory device to determine that the voltage measured at the contact meets or exceeds a threshold voltage at or after expiration of a predetermined time, instructions that cause the accessory device to conclude that the host device is connected to the accessory device, instructions that cause the accessory device to provide a second current over the contact to the host device, instructions that cause the accessory device to authenticate the accessory device to the host device, and instructions that cause the accessory device to provide a third current to the host device over the contact upon successful authentication. In a particular embodiment, the first current is smaller than the second current.

FIG. 1 is a simplified block diagram of a system 100 including a host (or electronic) device 102 and accessory 104 according to an embodiment of the present invention. In this embodiment, host device 102 can provide computing, communication and/or media playback capability. Host device 102 can include processing subsystem 110, storage device 112, user interface 114, network interface 116, and accessory input/output (I/O) interface 118. Host device 102 can also include other components (not explicitly shown) such as a battery, power controllers, and other components operable to provide various enhanced capabilities.

Storage device 112 can be implemented, e.g., using disk, flash memory, or any other non-transitory storage medium, or a combination of media, and can include volatile and/or nonvolatile media. In some embodiments, storage device 112 can store data objects such as audio files, video files, image or artwork files, information about a user's contacts (names, addresses, phone numbers, etc.), information about a user's scheduled appointments and events, notes, and/or other types of information. In some embodiments, storage device 112 can also store one or more application programs to be executed by processing subsystem 110 (e.g., video game programs, personal information management programs, media playback programs, etc.).

User interface 114 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 114 to invoke the functionality of host device 102 and can view and/or hear output from host device 102 via output devices of user interface 114.

Processing subsystem 110 can be implemented as one or more integrated circuits, e.g., one or more single-core or multi-core microprocessors or microcontrollers, examples of which are known in the art. In operation, processing system 110 can control the operation of host device 102. In various embodiments, processing subsystem 110 can execute a variety of programs in response to program code and can maintain multiple concurrently executing programs or processes. At any given time, some or all of the program code to be executed can be resident in processing subsystem 110 and/or in storage media such as storage device 112.

Through suitable programming, processing subsystem 110 can provide various functionality for host device 102. For example, in response to a request from accessory 104, processing subsystem 110 can initiate a buffer transfer session to transfer a data object stored in storage device 112 to accessory 104 via accessory I/O interface 118. Processing subsystem 110 can also execute other programs to control other functions of host device 102, including application programs that may be stored in storage device 112; in some embodiments, these application programs may include instructions that generate requests to send or receive data objects, and processing subsystem 110 can initiate a buffer transfer session to service any such requests.

Network interface 116 can provide voice and/or data communication capability for host device 102. In some embodiments network interface 116 can include radio frequency (RF) transceiver components for accessing wireless voice and/or data networks (e.g., using cellular telephone technology, advanced data network technology such as 3G, 4G LTE, or EDGE, WiFi (IEEE 802.11 family standards), or other mobile communication technologies, or any combination thereof), components for short-range wireless networking (e.g., using Bluetooth standards), GPS receiver components, and/or other components. In some embodiments network interface 116 can provide wired network connectivity (e.g., Ethernet) in addition to or instead of a wireless interface. Network interface 116 can be implemented using a combination of hardware (e.g., driver circuits, antennas, modulators/demodulators, encoders/decoders, and other analog and/or digital signal processing circuits) and software components.

Accessory I/O interface 118 can allow host device 102 to communicate with various accessories. For example, accessory I/O interface 118 can support connections to a computer, an external keyboard, a speaker dock or media playback station, a digital camera, a radio tuner, an in-vehicle entertainment system or head unit, an external video device, a memory card reader, and so on. In some embodiments, accessory I/O interface 118 can include a connector, such as connectors corresponding to the connectors used in various iPod®, iPhone®, and iPad® products, as well as supporting circuitry. The connector can provide connections for power and ground as well as for one or more data communication interfaces such as Universal Serial Bus (USB), FireWire (IEEE 1394 standard), and/or universal asynchronous receiver/transmitter (UART). In some embodiments, the connector provides dedicated power and ground contacts, as well as some number (e.g., four) of programmable digital data contacts that can be used to implement different communication technologies in parallel; for instance, two pins can be assigned as USB data pins (D+ and D−) and two other pins can be assigned as serial transmit/receive pins (e.g., implementing a UART interface); the assignment of pins to particular communication technologies can be negotiated while the connection is being established. In some embodiments, the connector can also provide connections for audio and/or video signals, which may be transmitted to or from host device 102 in analog and/or digital formats. Thus, accessory I/O interface 118 can support multiple communication channels, and a given accessory can use any or all of these channels. In some embodiments, accessory I/O interface 118 can support wireless communication (e.g., via WiFi, Bluetooth, or other wireless protocols) in addition to or instead of wired communication channels.

Accessory 104 can include controller 130, user interface device 132, storage medium 133, other accessory-specific hardware 134, and host I/O interface 136. Accessory 104 is representative of a broad class of accessories that can interoperate with a host device, and such accessories can vary widely in capability, complexity, and form factor. Various accessories may include components not explicitly shown in FIG. 1, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on. In addition, some accessories may provide an additional interface (not shown) that can connect to and communicate with another accessory.

Controller 130 can include, e.g., one or more single-core or microprocessors and/or microcontrollers executing program code to perform various functions associated with accessory 104. For example, where accessory 104 incorporates a user-operable control, controller 130 can interpret user operation of the control and responsively invoke functionality of accessory 104; in some instances, the invoked functionality can include sending information to and/or receiving information from host device 102.

User interface 132 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 104, a user can operate input devices of user interface 132 to invoke functionality of accessory 104.

Storage medium 133 can incorporate any type of data storage media, including but not limited to disk, flash memory, or any other non-transitory storage medium, or a combination of media, and can include volatile and/or non-volatile media. Storage medium 133 can be used to store program code to be executed by controller 130, data objects received from host device 102, and any other data or instructions that may be generated and/or used in the operation of accessory 104.

Accessory-specific hardware 134 can include any other components that may be present in accessory 104 to enable its functionality. For example, in various embodiments accessory-specific hardware 134 can include one or more storage devices using fixed or removable storage media; GPS receiver; a network interface; power supply and/or power management circuitry; environmental sensors (e.g., temperature sensor, pressure sensor, accelerometer, chemical sensor, etc.); and so on. It is to be understood that any type of accessory functionality can be supported by providing appropriate accessory-specific hardware 134. In some embodiments, accessory specific hardware 134 may include circuitry for detecting connection with host device 102. In a specific embodiment, accessory specific hardware 134 may include circuitry for detecting connection with host device 102 when host device 102 is powered off or has a dead battery that prevents host device from communicating with accessory 104.

Host I/O interface 136 can allow accessory 104 to communicate with host device 102. In accordance with some embodiments of the invention, host I/O interface 136 can include a connector that mates directly with a connector included in host device 102, such as a connector complementary to the connectors used in various iPod®, iPhone®, and iPad® products. Such a connector can be used to supply power to host device 102 and/or receive power from host device 102, to send and/or receive audio and/or video signals in analog and/or digital formats, and to communicate information using one or more data communication interfaces such as USB, UART, and/or FireWire. Other connectors may also be used; for example, host I/O interface 136 can incorporate a standard USB connector and can connect to accessory I/O interface 118 of host device 102 via an adapter cable. In other embodiments, host I/O interface 136 can support wireless communication (e.g., via WiFi, Bluetooth, or other wireless protocols) in addition to or instead of wired communication channels.

Accessory 104 can be any electronic apparatus that interacts with host device 102. In some embodiments, accessory 104 can provide remote control over operations of host device 102, or a remote user interface that can include both input and output controls (e.g., a display screen to display current status information obtained from host device 102). Accessory 104 in various embodiments can control any function of host device 102 and can also receive data objects from host device 102. In other embodiments, host device 102 can control operations of accessory 104, such as retrieving stored data from a storage medium of accessory 104, initiating an image capture operation by a camera incorporated into accessory 104, etc.

It will be appreciated that the system configurations and components described herein for the host device and the accessory are illustrative and that variations and modifications are possible. The host device and/or accessory may have other capabilities not specifically described herein (e.g., mobile phone, global positioning system (GPS), broadband data communication, Internet connectivity, etc.).

Connectors at the respective I/O interfaces 118, 136 of host device 102 and accessory 104 can be complementary or not as desired. Where two connectors are not complementary, an adapter (not shown) can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while the host device and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Accessory I/O interface 118 of host device 102 and host I/O interface 136 of accessory 104 allow host device 102 to be connected with accessory 104 and subsequently disconnected from accessory 104. As used herein, a host device and an accessory are "connected" whenever a communication channel is established between their respective interfaces and "disconnected" when the channel is terminated. Such connection can be achieved via direct physical connection, e.g., with mating connectors; indirect physical connection, e.g., via a cable; and/or wireless connection, e.g., via Bluetooth.

Figure 2A:
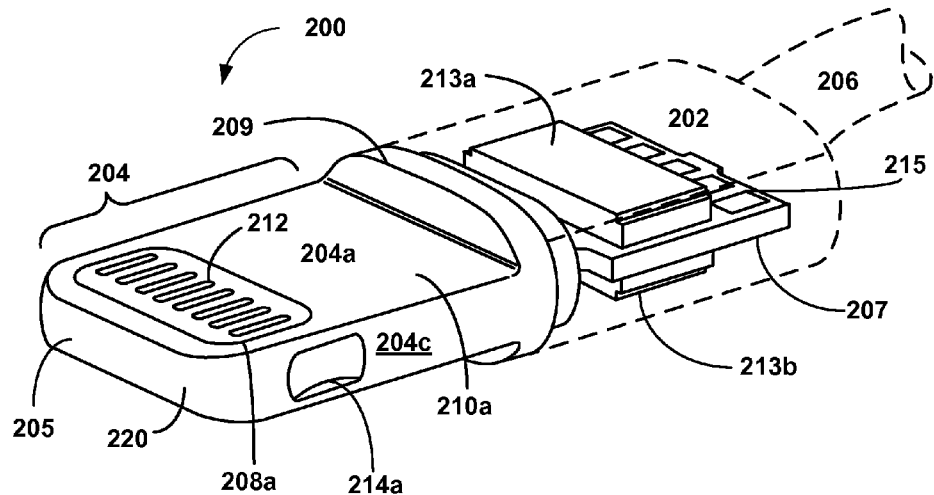
FIG. 2A is an isometric view of a plug connector for an accessory device according to an embodiment of the present invention.

FIG. 2A is an isometric view of a connector 200 that can be associated with accessory 104. For instance, connector 200 can be implemented as accessory I/O interface 118 of FIG. 1. In a particular embodiment, connector 200 can be a plug connector. Plug connector 200 is exemplary and is used herein to explain the various embodiments of the present invention. One skilled in the art will realize that many other forms and types of connectors other than plug connector 200 can be used and that techniques described herein will apply to any connector that has the characteristics of plug connector 200. In some embodiments, plug connector 200 may be associated with an accessory that can be coupled to a host device.

Plug connector 200 includes a body 202 and a tab portion 204. A cable 106 is attached to body 102 and tab portion 204 and extends longitudinally away from body 202 in a direction parallel to the length of the connector 200. Tab 204 is sized to be inserted into a corresponding receptacle connector during a mating event and includes a first contact region 208a formed on a first major surface 204a and a second contact region 208b (not shown in FIG. 2A) formed at a second major surface 204b (also not shown in FIG. 2A) opposite surface 204a. Surfaces 204a, 204b extend from a distal tip of the tab to a spine 209 that, when tab 204 is inserted into a corresponding receptacle connector, abuts a housing of the receptacle connector or portable electronic device the receptacle connector is incorporated in. Tab 204 also includes first and second opposing side surfaces 204c, 204d (not shown) that extend between the first and second major surfaces 204a, 204b. In one particular embodiment, tab 204 is about 6.6 mm wide, about 1.5 mm thick and has an insertion depth (the distance from the tip of tab 204 to spine 209) of about 7.9 mm.

A plurality of contacts 212 can be formed in each of contact regions 208a and 208b such that, when tab 204 is inserted into a corresponding receptacle connector, contacts 212 in regions 208a or 208b are electrically coupled to corresponding contacts in the receptacle connector. In some embodiments, contacts 212 are self-cleaning wiping contacts that, after initially coming into contact with a receptacle connector contact during a mating event, slide further past the receptacle connector contact with a wiping motion before reaching a final, desired contact position.

As an example, in one embodiment an ID module is embodied within an IC operatively coupled to the contacts of connector 200. The ID module can be programmed with identification and configuration information about the connector and/or its associated accessory/adapter that can be communicated to a host device during a mating event. As another example, an authentication module programmed to perform an authentication routine, for example a public key encryption routine, with circuitry on the host device can be embodied within an IC operatively coupled to connector 200. The ID module and authentication module can be embodied within the same IC or within different ICs. As still another example, a current regulator can be embodied within one of IC's 213a or 213b. The current regulator can be operatively coupled to contacts that are able to deliver power to charge a battery in the portable electronic device and regulate current delivered over those contacts to ensure a constant current regardless of input voltage and even when the input voltage varies in a transitory manner. The function of the IC's is further described below in reference to FIG. 4.

Bonding pads 215 can also be formed within body 202 near the end of PCB 207. Each bonding pad can be connected to a contact or contact pair within regions 208a and 208b. Wires (not shown) can then be soldered to the bonding pads to provide an electrical connection from the contacts to circuitry within an accessory associated with connector 200. In some embodiments, however, bonding pads are not necessary and instead all electrical connections between the contacts and components of connector 200 and other circuitry within an accessory are made through traces on a PCB that the circuitry is coupled to and/or by interconnects between multiple PCBs within the accessory.

The structure and shape of tab 204 is defined by a ground ring 205 that can be made from stainless steel or another hard conductive material. Connector 200 includes retention features 214a, 214b (not shown) formed as curved pockets in the sides of ground ring 205 that double as ground contacts. Body 202 is shown in FIG. 2A in transparent form (via dotted lines) so that certain components inside the body are visible. As shown, within body 202 is a printed circuit board (PCB) 207 that extends into ground ring 205 between contact regions 208a and 208b towards the distal tip of connector 200. One or more integrated circuits (ICs), such as Application Specific Integrated Circuit (ASIC) chips 213a and 213b, can be operatively coupled to PCB 207 to provide information regarding connector 200 and/or to perform specific functions, such as authentication, identification, contact configuration and current or power regulation.

Figure 2B:
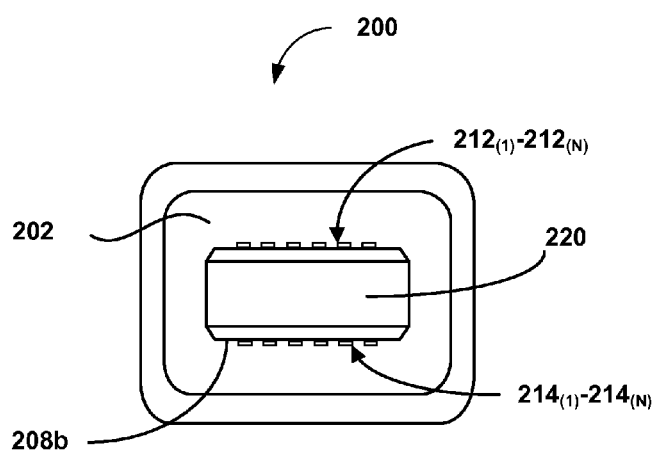
FIG. 2B is front view of the plug connector according to an embodiment of the present invention.

FIG. 2B illustrates a front view of plug connector 200. The front view illustrates a cap 220. Cap 220 can be made from a metal or other conductive material and can extend from the distal tip of connector 200 along the side of the connector towards body 202 either fully or partially surrounding contacts 212 formed in contact regions 208a and 208b in the X and Y directions. In some embodiments, cap 220 can be grounded in order to minimize interference that may otherwise occur on contacts 212 of connector 200 and can thus be referred to as a ground ring, e.g., ground ring 205 illustrated in FIG. 2A. Contacts $212_{(1)}$-$212_{(N)}$ can be positioned within contact region 208a and additional contacts $214_{(1)}$-$214_{(N)}$ can be positioned within region 208b on the opposing surface of tab 204. In some embodiments, N can be between 2 and 8. Contacts $212_{(1)} \ldots 212_{(N)}$ and $214_{(1)} \ldots 214_{(N)}$ can be used to carry a wide variety of signals including digital signals and analog signals as well as power and ground.

Figure 2C:
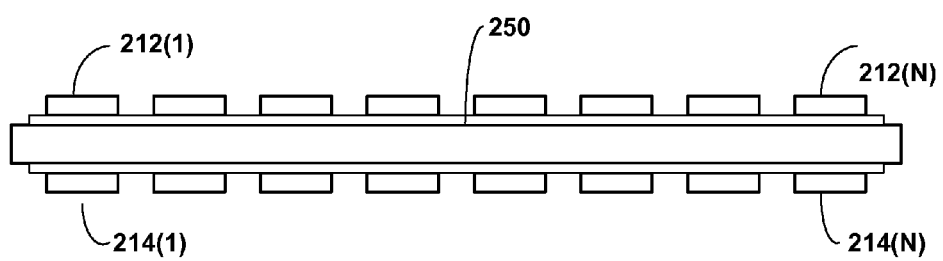
FIG. 2C illustrates contacts of a plug connector according to an embodiment of the present invention.

FIG. 2C illustrates a cross-sectional schematic view of contacts 212, 214 and positioning of the contacts. Contacts 212, 214 can be mounted on either side of a PCB 250 as illustrated. In some embodiments, opposing contacts, e.g., $212_{(1)}$ and $214_{(1)}$ may be shorted or electrically connected to each other through PCB 250, e.g., using a via, to create an in-line connector design. In other embodiments, one contact from the top row of contacts 212 may be connected to at least one contact from the bottom row of contacts 214. In still other embodiments, all contacts may be independent with no connections between any of the contacts or the contacts may have other connections schemes between them. In the instance where each contact is independent and not connected to any other contact, a different receptacle connector may be used. Contacts 212, 214 can be made from a copper, nickel, brass, a metal alloy or any other appropriate conductive material. Spacing is consistent between each of the contacts on the front and back sides and between the contacts and the edges of the connector providing 180 degree symmetry so that plug connector 200 can be inserted into a corresponding receptacle connector in either of two orientations.

Figure 2D:
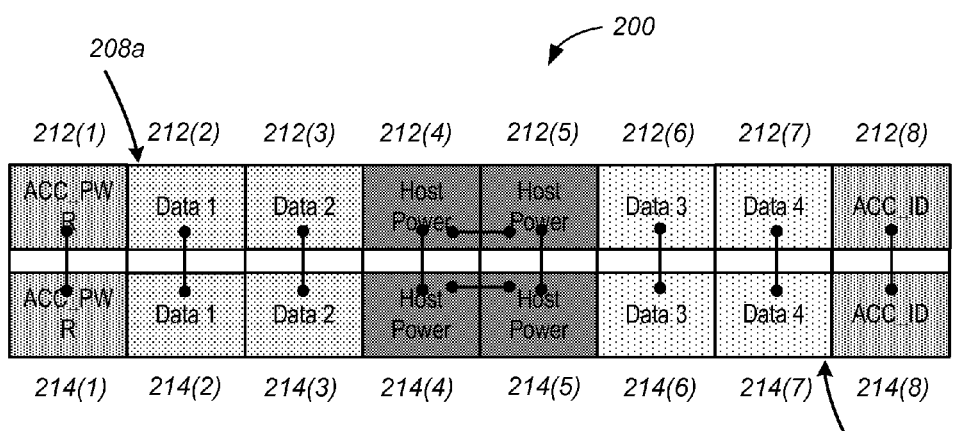
FIG. 2D is a pinout of a plug connector according to an embodiment of the present invention.

When connector 200 is properly engaged with a receptacle connector, each of contacts $212_{(1)}$-$212_{(N)}$ or $214_{(1)}$-$214_{(N)}$ may be in electrical connection with a corresponding contact of the receptacle connector. FIG. 2D illustrates a pin-out configuration for connector 200 according one particular embodiment of the present invention as described in connection with FIG. 2C above.

The pin-out shown in FIG. 2D includes four contacts $212_{(4)}$, $212_{(5)}$, $214_{(4)}$, and $214_{(5)}$ that are electrically coupled together to function as a single contact dedicated to carrying power to a connected host device. Connector 200 may also include accessory ID contacts $212_{(8)}$ and $214_{(8)}$; accessory power contacts $212_{(1)}$ and $214_{(1)}$; and eight data contacts arranged in four pairs. The four pairs of data contacts may be (a) $212_{(2)}$ and $212_{(3)}$, (b) $212_{(6)}$ and $212_{(7)}$, (c) $214_{(2)}$ and $214_{(3)}$, and (d) $214_{(6)}$ and $214_{(7)}$. Host power contacts $212_{(4)}$, $212_{(5)}$, $214_{(4)}$, and $214_{(5)}$ carry power from an accessory associated with connector 200 to a portable electronic device that is coupled to the accessory via connector 200. The host power contacts can be sized to handle any reasonable power requirement for an electronic device or host device, and for example, can be designed to carry between 3-20 Volts from an accessory to charge the portable electronic device connected to connector 200. In this embodiment, host power contacts $212_{(4)}$, $212_{(5)}$, $214_{(4)}$, and $214_{(5)}$ are positioned in the center of contact regions 208a, 208b to improve signal integrity by keeping power as far away as possible from the sides of ground ring 205.

Accessory power contacts $212_{(1)}$ and $214_{(1)}$ can be used for an accessory power signal that provides power from the electronic device (i.e. the host device) to an accessory. The accessory power signal is typically a lower voltage signal than the host power in signal received over host power contacts $212_{(4)}$ and $212_{(5)}$, for example, 3.3 volts as compared to 5 volts or higher. The accessory ID contacts provide a communication channel that enables the host device to authenticate the accessory and enable the accessory to communicate information to the host device about the accessory's capabilities as described in more detail below.

The four pairs of data contacts (a) $212_{(2)}$ and $212_{(3)}$, (b) $212_{(6)}$ and $212_{(7)}$, (c) $214_{(2)}$ and $214_{(3)}$, and (d) $214_{(6)}$ and $214_{(7)}$ may be used to enable communication between the host and accessory using one or more of several different communication protocols. For example, data contacts $212_{(2)}$ and $212_{(3)}$ are positioned adjacent to and on one side of the power contacts, while data contacts $212_{(6)}$ and $212_{(7)}$ are positioned adjacent to but on the other side of the power contacts. A similar arrangement of contacts can be seen for contacts 214 on the other surface of the PCB. The accessory power and accessory ID contacts are positioned at each end of the connector. The data contacts can be high speed data contacts that operate at rate that is two or three orders of magnitude faster than any signals sent over the accessory ID contact which makes the accessory ID signal look essentially like a DC signal to the high speed data lines. Thus, positioning the data contacts between the power contacts and the ID contact improves signal integrity by sandwiching the data contacts between contacts designated for DC signals or essentially DC signals.

Figure 2E:
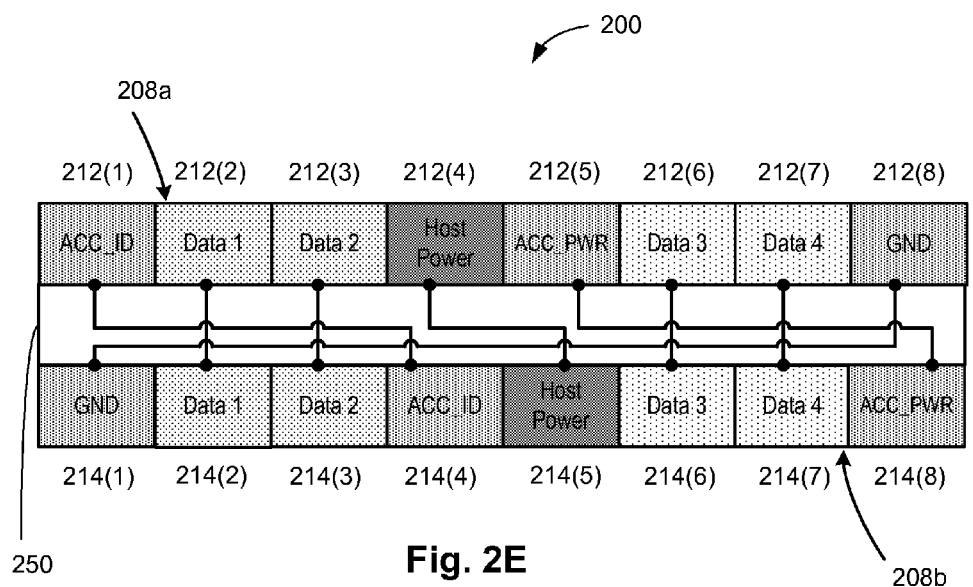
FIG. 2E is a pinout of a plug connector according to another embodiment of the present invention.

FIG. 2E illustrates a pin-out configuration for a connector 200 according another particular embodiment of the present invention.

Connector 200 is a reversible connector. In other words, based on the orientation in which connector 200 is mated with a corresponding connector of a host device, either the contacts on the surface 208a or 208b are in physical and electrical contact with the contacts in the corresponding connector of the host device. As illustrated in FIG. 2E, connector 200 may have eight contacts arranged on an upper surface of a PCB 250 and eight contacts arranged on a lower surface of PCB 250.

Connector 200 includes two contacts $212_{(1)}$ and $214_{(4)}$ that can function as accessory ID contacts to carry the identification signals between the accessory and the portable electronic device. Contacts $212_{(1)}$ and $214_{(4)}$ are electrically connected to each other as illustrated in FIG. 2E. Connector 200 can have four pairs of data contacts, (a) $212_{(2)}$ and $212_{(3)}$, (b) $212_{(6)}$ and $212_{(7)}$, (c) $214_{(2)}$ and $214_{(3)}$, and (d) $214_{(6)}$ and $214_{(7)}$. In this particular embodiment, opposing data contacts, e.g., $212_{(2)}$ and $214_{(2)}$, are electrically connected to each other via PCB 250 as illustrated in FIG. 2E. Connector 200 may further include host power contacts $212_{(4)}$ or $214_{(5)}$ that may be electrically connected to each other. Host power contacts $212_{(4)}$ or $214_{(5)}$ can carry power to the host device that is mated with connector 200. For example, plug connector 200 may be part of a power supply system designed to provide power to the host device. In this instance, either contact $212_{(4)}$ or $214_{(5)}$ may carry power from the power supply to the host device, e.g., to charge a battery in the host device.

Connector 200 may further include accessory power contacts $212_{(5)}$ and $214_{(8)}$ that may be electrically connected to each other, e.g., via PCB 250. Accessory power contacts carry power from the host device to a connected accessory. For example, in some instances, an accessory connected to the host device may not be self-powered and may derive its power from the host device. In this instance, the host device can supply power to the accessory over either of the accessory contacts, depending on the orientation of connector 200 with respect to a corresponding connector of the host device. Connector 200 may further include two ground contacts $212_{(8)}$ and $214_{(1)}$ electrically connected to each other. The ground contacts provide a ground path for connector 200.

Figure 3A:
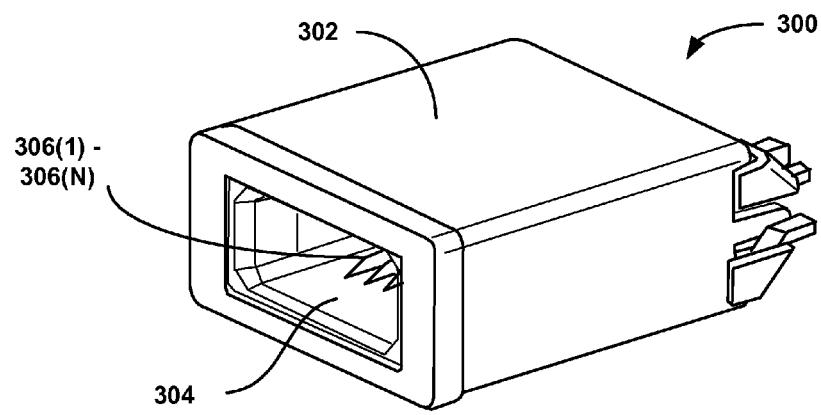
FIG. 3A illustrates a receptacle connector for a host device according to an embodiment of the present invention.

FIG. 3A illustrates a receptacle connector 300 according to an embodiment of the present invention. Receptacle connector 300 includes a housing 302 that defines a cavity 304 and houses N contacts $306_{(1)}$-$306_{(N)}$ within the cavity. In operation, a connector plug, such as plug connector 200 can be inserted into cavity 304 to electrically couple the contacts $212_{(1)}$-$212_{(N)}$ or $214_{(1)}$-$214_{(N)}$ to respective contacts $306_{(1)}$-$306_{(N)}$. Each of the receptacle connector contacts $306_{(1)}$-$306_{(N)}$ electrically connects its respective plug contact to circuitry associated with the electrical/host device in which receptacle connector 300 is housed. For example, receptacle connector 300 can be part of host device 102 and electronic circuitry associated with the host device is electrically connected to receptacle 300 by soldering tips of contacts $306_{(1)}$-$306_{(N)}$ that extend outside housing 302 to a multilayer board such as a printed circuit board (PCB) within the portable media device. Note that connector 300 includes contacts on just a single side so it can be made thinner. In other embodiments, connector 300 may have contacts on each side.

FIG. 3B illustrates a cross section view of receptacle connector 300 according to an embodiment of the present invention. As illustrated, in some embodiments, Additional contacts $308_{(1)}$ and $308_{(2)}$ are located at either ends of contacts $306_{(1)}$-$306_{(N)}$. Contacts $308_{(1)}$ and $308_{(2)}$ may be used to detect whether the plug connector is fully inserted into cavity 304 or inserted to a point where contacts 212 (or 214) of plug connector 200 are physically coupled to contacts 306 of receptacle connector 300. In some embodiments, contacts $308_{(1)}$ and $308_{(2)}$ can also be used to detect whether the plug connector has been disconnected from the receptacle connector. In some embodiments, contacts 308 can make contact with cap 220 of plug connector 200 when the plug connector is inserted beyond a certain distance within cavity 304. In some embodiments, contacts 308 are placed such that they will make contact with the ground ring of plug connector only when contacts 212 make a solid physical connection with contacts 306. In some embodiments, when contacts 308 connect to the ground ring of the plug connector, a signal may be generated indicating the connection.

In some embodiments, the receptacle connector 300 may have contacts $306_{(1)-(N)}$ only on a single side inside cavity 304 as described above. In a particular embodiment, receptacle connector 300 may have eight (8) contacts $306_{(1)}$-$306_{(8)}$. Some or all of these contacts may be configured to perform one of several functions depending on the signals available on a plug connector. Plug connector 200 may be associated any one of several accessories that may be designed to work with a host device that is associated with receptacle connector 300. For example, plug connector 200 may be associated with an audio only accessory in which case the signals available on the contacts, e.g., $206_{(1)}$-$206_{(N)}$, of the plug connector may include audio and related signals. In other instances, where plug connector 200 is associated with a more complex accessory such as video accessory, the contacts of plug connector may carry audio, video, and related signals. Thus, in order to enable receptacle connector 300 to be operable with various different types of signal, contacts $306_{(1)-(8)}$ of receptacle connector 300 can be made configurable based on the signals available from a plug connector 200.

In the particular embodiment, receptacle connector 300 has eight contacts $306_{(1)-(8)}$ in addition to two connection detection contacts $308_{(1)}$ and $308_{(2)}$. The operation of the connection detection contacts $308_{(1)}$ and $208_{(2)}$ is described above in relation to FIG. 3B. Some or all of contacts $306_{(1)}$-$306_{(8)}$ may have an associated switch that can configure the contact to carry one of many possible signals. It is to be noted that some other contacts from among contacts $306_{(1)}$-$306_{(8)}$ may each have a similar switch coupled to it. The switch can be used to configure its associated contact to carry any one of signals $S_1$-$S_n$ depending on the configuration of the plug connector.

In a particular embodiment, contact $306_{(1)}$ may be an identification bus pin (ACC_ID) and can be configured to communicate a command operable to cause an accessory to perform a function and provide a response to a host device unique to the command. The command may be any one or more of a variety of commands, including a request to identify a connector pin and select one of a plurality of communication protocols for communicating over the identified connector pin, a request to set a state of the accessory, and a request to get a state of the accessory. Contact $306_{(1)}$ may also or alternatively be configured to communicate power from the host device to the accessory (e.g., ACC_PWR). For example, contact $306_{(1)}$ may be coupled to a positive (or negative) voltage source within the host device so as to generate a voltage differential with another contact (such as a ground contact which may be, e.g., contact $306_{(8)}$).

In a particular embodiment, contacts $306_{(2)}$ and $306_{(3)}$ may form a first pair of data contact (DP1/DN1). The data contacts may be configured to carry one or more of a variety of signals, such as (a) USB differential data signals, (b) non-USB differential data signal, (c) UART transmit signal, (d) UART receive signal, (e) digital debug input/output signals, (f) a debug clock signal, (g) audio signals, (h) video signals, etc.

In a particular embodiment, contact $306_{(4)}$ may carry incoming power (e.g., a positive voltage relative to another contact such as a ground pin) to the host device (e.g., from a power source in or coupled to the accessory) with which receptacle connector 200 is associated. Contact $306_{(5)}$ may also function as an identification bus pin (ACC_ID) similar to contact $306_{(1)}$ described above. Contact $306_{(5)}$ may also or alternatively be configured to communicate power from the host device to the accessory (e.g., ACC_PWR), depending on the orientation of a connected plug connector 200 (or connector 200) with respect to receptacle connector 300.

In a particular embodiment, contacts $306_{(6)}$ and $306_{(7)}$ may form a second pair of data pins (DP2/DN2) and can each be configured to carry one or more of a variety of signals, such as (a) USB differential data signals, (b) non-USB differential data signal, (c) UART transmit signal, (d) UART receive signal, (e) digital debug input/output signals, (f) a debug clock signal, (g) audio signals, (h) video signals, etc.

In a particular embodiment, contact $306_{(8)}$ may be a ground pin or otherwise provided at a voltage potential lower than contacts $306_{(1)}$, $306_{(4)}$, and $306_{(5)}$ so as to provide a voltage potential for power being provided to or from the host device.

In some embodiments, tab 204 has a 180 degree symmetrical, double orientation design which enables plug connector 200 (or connector 200) to be inserted into receptacle 300 in both a first orientation and a second orientation.

Figures 3C, 3D:
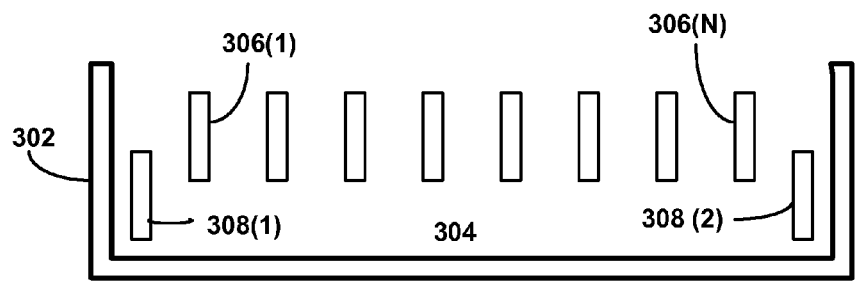
FIGS. 3C and 3D are pinouts for a receptacle connector according to two different embodiments of the present invention.

FIGS. 3C and 3D illustrate pin-out configuration for a receptacle connector according to two different embodiments of the present invention. In one embodiment, receptacle connector 300 has a pin-out as shown in FIG. 3C that matches pin-out of connector 200 in FIG. 1D and in another embodiment receptacle connector 300 has a pin-out as shown in FIG. 3D that matches pin-out of connector 200 of FIG. 1E. In each of FIGS. 3C and 3D, the ACC1 and ACC2 pins are configured to mate with either the accessory power (ACC_PWR) or accessory ID (ACC_ID) pins of the plug connector depending on the insertion orientation of plug connector, the pair of Data A contacts is configured to mate with either the pair of Data 1 contacts or the pair of Data 2 contacts of the plug connector, and the P_IN (power in) pin or pins are configured to mate with the Host Power contact or contacts of the plug connector. Additionally, in the pin-out of FIG. 3D, the GND contact is configured to mate with the GND contact in the plug connector.

Figure 4:
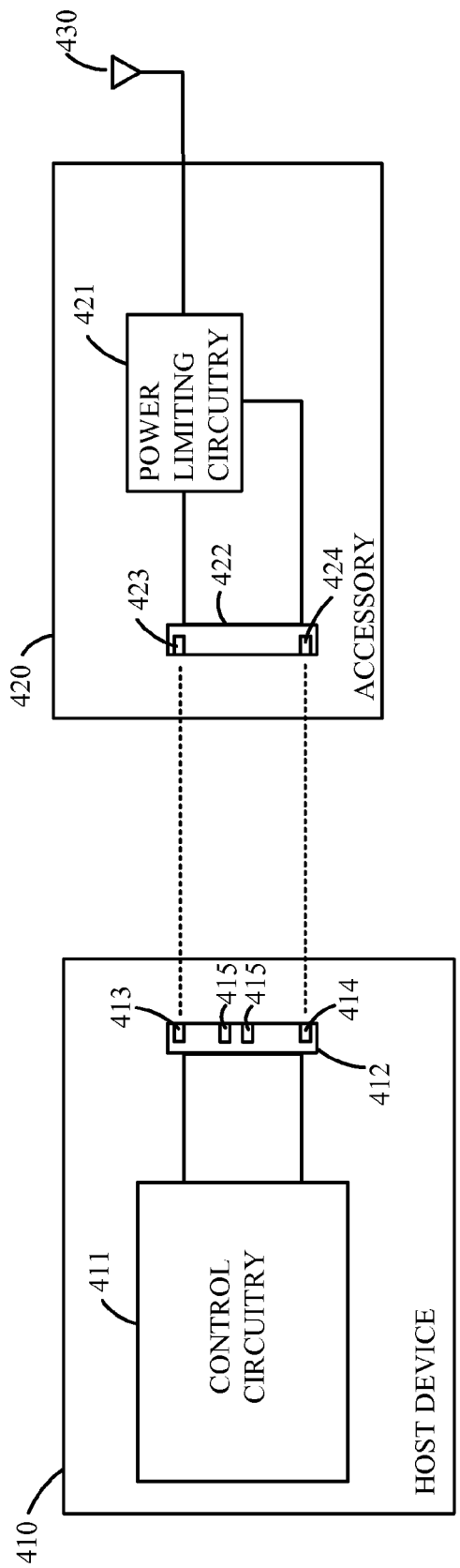
FIG. 4 illustrates a functional block diagram illustrating connections between a host device and an accessory according to an embodiment of the present invention.

FIG. 4 illustrates connection of an accessory 420 (e.g., implementing accessory 104 of FIG. 1) to a host device 410 (e.g., implementing host device 102 of FIG. 1) according to an embodiment of the present invention. In this embodiment a connector 422 (e.g., implementing plug connector 200 of FIG. 2A) of accessory 420 can be physically mated with connector 412 (e.g., implementing receptacle connector 300 of FIG. 3A) of host device 410. Both connectors 422 and 412 may have additional pins as described above. When connector 422 is physically mated with connector 412, the corresponding contacts of the two connectors are also physically connected with each other. For example, as shown in FIG. 4, contact 423 of connector 422 is physically connected to contact 413 of connector 412 and contact 424 of connector 422 is connected to contact 414 of connector 412. It is to be noted that only two contacts are shown in FIG. 4 for ease of explanation. One skilled in the art will realize that other contacts in the two connectors may also be physically connected to each other.

At accessory 420, power limiting circuitry 421 may monitor pin 424 for incoming power and/or requests. For example, in one embodiment, power may be communicated from host device 410 to accessory 420 via pin 424 (e.g., ACC_PWR contact described above). This power may be used for accessory 420 to operate in the event accessory 420 cannot acquire operating power from other sources such as power source 430 or does not have an internal power source. If power is not received, then power limiting circuitry 421 may continue to monitor pin 424. However, if power is received from host device 410, then power limiting circuitry 421 may disable a power path between power source 430 and host device 410. In some cases, the power path may be disabled by default, and thus further disabling may be omitted. Once the power path is disabled, power limiting circuitry 421 may receive and read the request for an accessory identifier. If the request is valid, then power limiting circuitry 421 may send an accessory identifier to host device 410, and enable (or re-enable) the power path between power source 430 and host device 410. Otherwise, power limiting circuitry 421 may continue to monitor pin 424.

In the instance that accessory 420 provides power to host device 410, once a connection has been established between host device 410 and accessory 420, the power path between power source 430 and host device 410 may be enabled. In some embodiments, this may allow host device 410 to acquire operating power from accessory 420, such as when the host device 410 does not have sufficient power to operate a main processor to execute software provided in the host device 410 (e.g., it has a dead battery). In other embodiments, host device 410 may have sufficient power to operate such software, in which case it may choose to continue operating using its own power or begin to operate using power supplied via the newly enabled power path.

Figure 5:
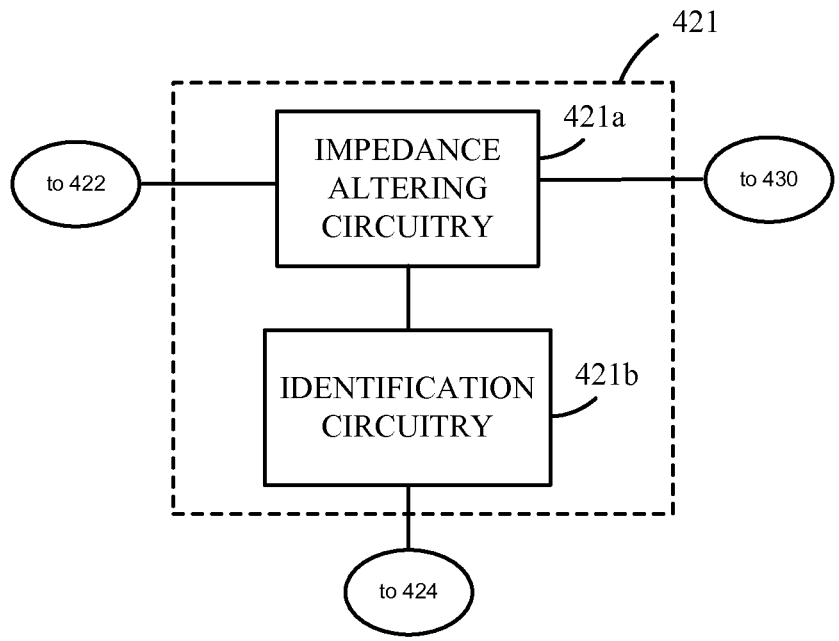
FIG. 5 is a high-level block diagram of a power limiting circuitry of an accessory according to an embodiment of the present invention.

In some embodiments, power limiting circuitry 421 may comprise a number of different circuits operable to perform different functions. For example, FIG. 5 illustrates a high level block diagram of power limiting circuitry 421 according to an embodiment of the present invention. In accordance with an embodiment, power limiting circuitry 421 includes impedance altering circuitry 421a and identification circuitry 421b. Impedance altering circuitry 421a may be disposed in the power path between power source 430 and host device 410, whereas identification circuitry 421b may be disposed between impedance altering circuitry 421a and pin/contact 424.

Identification circuitry 421b, which may be implemented as single integrated circuit (IC) chip, may be operable to receive data from host device 410 via pin 424 and respond to the received data. For example, identification circuitry 421b may have stored therein an accessory identifier, and may be operable to communicate the accessory identifier to host device 410 in response to receiving a request for the accessory identifier. Identification circuitry 421b may also be operable to send instructions to impedance altering circuitry 421a instructing impedance altering circuitry 421a to alter an impedance of the power path between power source 430 and host device 410.

Impedance altering circuitry 421a, which may be implemented as a single IC chip or together with identification circuitry 421b as a single IC chip, may be operable to alter an impedance of the power path between power source 430 and host device 410. The altering of the impedance may be in response to an instruction from identification circuitry 421b or, in some embodiments, in response to an instruction sent directly from host device 410. There are various ways that impedance altering circuitry 421a may alter the impedance of the power path, as further described herein.

Figure 6:
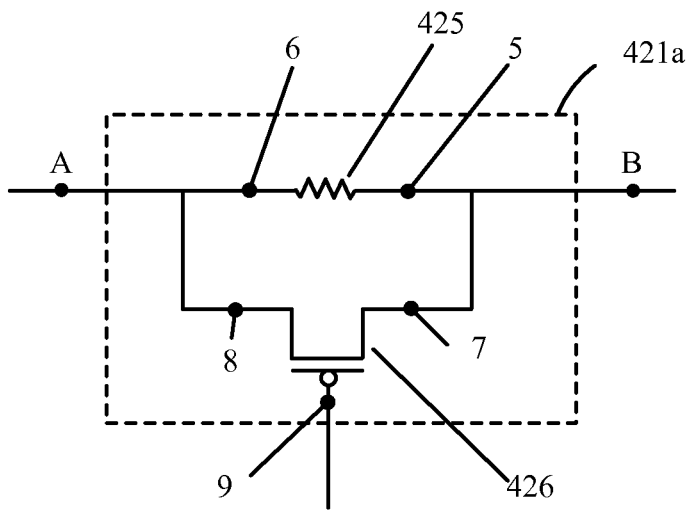
FIG. 6 is a schematic of an impedance altering circuitry for an accessory according to an embodiment of the present invention.

FIG. 6 is a schematic of impedance altering circuitry 421a according to one embodiment of the present invention. Impedance altering circuitry 421a according to this embodiment includes a resistive element 425 coupled in parallel with a switch 426 where both are arranged in a power path between points A and B. Resistive element 425 may provide any suitable resistance for measurably altering an impedance characteristic of power limiting circuitry 421a. For example, resistive element 425 may have a resistance of 1 Ohm, 2 Ohm's, 3 Ohm's, 100 Ohm's, 200 Ohm's, 300 Ohm's, 1 kOhm, 2 kOhm's, 3 kOhm's, 1 MOhm, 2 MOhm's, 3 MOhm's, be in a range from 1 to 3 Ohm's, 100 Ohm's to 300 Ohm's, 1 kOhm to 3 kOhm, 1 MOhm to 3 MOhm's, or less than 1 Ohm or greater than 3 MOhm's. Resistive element 425 includes a first end 5 that may be coupled to power source 430, and a second end 6 that may be coupled to power pin 423 of connector 422, such that resistive element 425 is disposed in a power path between power source 430 and host device 410. In some embodiments, resistive element 425 may be implemented as a current limited source or Low-Dropout regulator (LDO) type device or circuitry.

Switch 426 may be any suitable switching element that allows current provided from power source 430 to selectively bypass resistive element 425. For example, switch 426 may be a MOSFET, JFET, or other type of transistor or other semiconductor device operable to switch electronic signals and power. Switch 426 is coupled in parallel to resistive element 425 and includes a first terminal 7 (e.g., a source) coupled to first end 5 of resistive element 425, a second terminal 8 (e.g., a drain) coupled to second end 6 of resistive element 425, and a third terminal 9 (e.g., a gate) for controlling the operation of switch 426. In some embodiments, first terminal 7 is coupled to power source 430, second terminal 8 is coupled to power pin 423, and third terminal 9 is coupled to pin 424 of connector 122. Switch 426, when in an OFF state, has a resistance significantly higher than the resistance of resistive element 425. When switch 426 is in an ON state, it has a resistance that is significantly lower than the resistance of resistive element 425.

As described above, power limiting circuitry 421 may operate to alter an impedance of a power path between power source 430 and host device 410. In some embodiments, power limiting circuitry 421 may operate in different modes, such as in a bypass mode and a power limiting mode. Such modes may be enabled/disabled in response to instructions from host device 410 and, in some embodiments; power limiting circuitry 421 may operate in some modes (e.g., the power limiting mode) by default. Operating by default in power limiting mode may advantageously reduce user risk to exposed voltage potentials, such as when connector 422 of accessory 420 is not connected to connector 412 of host device 410. For example, when the accessory is first connected to the host device, the accessory may enable the power limiting mode in which switch 426 is turned OFF thereby routing the power from power source 430 via resistive element 425. Depending on the value of resistive element 425 and output voltage of power source 430, a fixed output current is available at point A. This current is usually very low, e.g., 15 mA. Thus initially only this small current is available to the host device. Once the host device confirms that the accessory is authentic, the accessory may turn ON switch 426 (bypass mode) resulting in the power being routed via switch 426. In this instance, a higher current is now available at point A since switch 426 presents very little resistance to the incoming voltage. In the instance where the host device is unable to confirm the authenticity of the accessory, the bypass mode is not enabled and the host device cannot receive power from the accessory.

In instances where the host device has enough power, when the accessory connector is mated with the host device connecter, the host device detects connection of the accessory device via the connection detection contacts described in reference to FIG. 3B above and initiates communication with accessory to authenticate the accessory and subsequently to receive power from the accessory.

However in instances when the host device has no power, e.g., the host device has a dead battery, the host device may be unable to detect connection of an accessory and thus unable to initiate communication with the accessory in order to receive power from the accessory. In this instance, it may be helpful to have a mechanism within the accessory to detect connection with a host device so that the accessory can provide enough power to the host device to initialize the controller/circuitry in the host device. Using this minimal power, the host device can then initiate communication with the accessory and thus be able to receive power from the accessory, as described above. In another instance when the accessory is a power supply, it would be desirable to only output minimal power, e.g., on the P_IN contact of the plug connector described above, in order to prevent dendrite growth and also to prevent arcing/damage to the plug connector if the contacts of the plug connector are accidently grounded or shorted. Once the accessory detects that there is a host device connected to the plug connector then it would be safe to output the normal power on its contacts.

Figure 7:
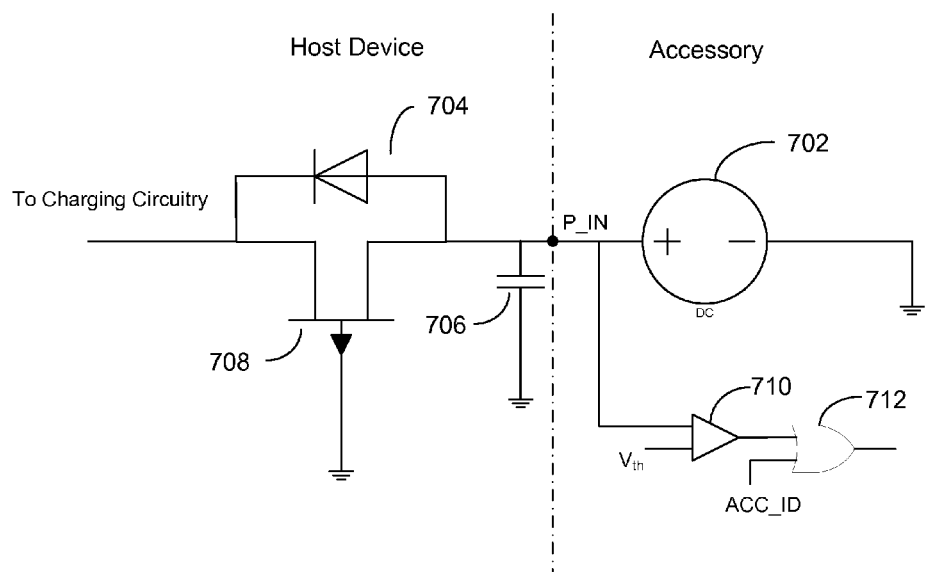
FIG. 7 illustrates circuitry for detecting connection of a host device according to an embodiment of the present invention.

FIG. 7 illustrates circuitry that enables an accessory to detect presence of a host device when the host device has no power, according to an embodiment of the present invention.

The accessory may include a constant current source 702. In some embodiments, current source 702 may provide between 10 µA and 1 mA of current. Current source 702 is disposed in the power path between the accessory and the host device. For example, current source may be connected to the P_IN contact of the accessory connector, e.g., plug connector 100 of FIG. 1. On the host side, the host device may include switch 708 connected in parallel to a diode device 704. These two components represent the resistive element within the host device. A capacitor 706 connected to the resistive element completes an RC circuit within the host device. In some embodiments, capacitor 706 may have a value of between 10 nF and 10 µF. Consider an instance where the accessory is a power supply. When the accessory is connected to a power source (e.g., a wall outlet), a conventional accessory will output the full voltage that the accessory is programmed to output. For example, if the conventional power supply is programmed to output 5V DC, then as soon as the conventional power supply is connected to a power source it will output the 5V via its connector regardless of whether a host device is connected to it or not.

The accessory as illustrated in FIG. 7 will not automatically output the full programmed voltage. Instead, the accessory according to the embodiment of the present invention outputs a certain voltage (e.g., between 3V and 5V) over the P_IN contact of its connector at a very low current value until detects a host device connection. This mode of operation of the accessory where the accessory outputs a very low current is referred to herein as the "connection detection mode" for ease of explanation. In some embodiments, the connection detection mode may be the default mode for the accessory. In some embodiments, the voltage/current is outputted over the P_IN contact in a pulsed manner instead of in a constant manner. For example, the accessory may output a voltage/current pulse with a duty cycle of between 0.1% and 1% and having a pulse width/duration of between 0.01 seconds and 0.001 seconds. In some embodiments, the frequency associated with the duty cycle can range between 100 Hz and 1000 Hz. This reduces and/or eliminates the possibility of dendrite growth over the contacts of the accessory connector since current/voltage is only present for a short period on the contact.

The accessory monitors the voltage at the P_IN contact after outputting the voltage/current pulse over the P_IN contact to determine whether a host device is connected. A comparator 710 is connected to the P_IN contact and receives a reference voltage $V_{th}$ as its other input. The output of comparator 710 is coupled to an OR gate 712, which receives the accessory identifier as its other input. The output of OR gate 712 is the power limiting mode described above in connection with FIGS. 5 and 6.

Figure 8:
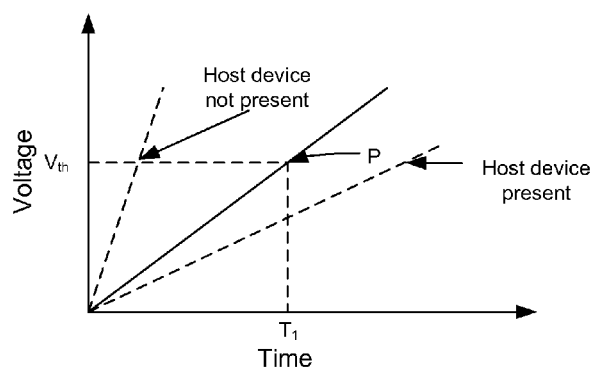
FIG. 8 is a graph illustrating relationship between measured voltage and time according to an embodiment of the present invention.

Consider that a host device is connected to the accessory. In this instance, when the accessory provides the current (in the connection detection mode) supplied by current source 702, the host-side circuitry (e.g., capacitor 706, diode 704 and switch 708) presents a certain capacitance and as a result the voltage at the P_IN contact begins to rise. If the measured voltage at the P_IN contact reaches the reference voltage $V_{th}$ at or after a certain time $T_1$, the accessory can conclude that a host device is connected to it. Based on the design of the accessory and/or the host device a suitable value for $V_{th}$ and $T_1$ can be programmed. In a particular embodiment, the value of $V_{th}$ may be between 0 volts and 1.8 volts and the value of $T_1$ can be between 1 microsecond and 100 microseconds. FIG. 8 illustrates the relationship between voltage measured at the P_IN contact and the time taken by the voltage to reach a certain value/level. As illustrated in FIG. 8, at point P, the voltage at the P_IN contact has reached the reference voltage $V_{th}$ in time $T_1$. In this disclosure, we will specify this relationship between voltage and time as indicating presence of a host device. If the measured voltage reaches the value of $V_{th}$ at any time before $T_1$ then the accessory concludes that no host is connected to the host device. If the measured voltage reaches the value of $V_{th}$ at or after time $T_1$, then the accessory concludes that a host device is connected to the accessory.

In the instance when the host device is not connected to the accessory, as soon as the current is provided over the P_IN contact, the voltage at the P_IN contact will rise to the output voltage specified for the connection detection mode (e.g., 3-5V as described above) before expiration of time $T_1$ since there is no capacitance presented at the P_IN contact. When the accessory detects that the voltage measure at the P_IN contact meets or exceeds $V_{th}$ prior to $T_1$ the accessory concludes that there is no host device connected it. The accessory then terminates the current/voltage output on the P_IN contact and continues operating in the connection detection mode in which it provides the detection current in a pulsed manner as described above.

If the accessory detects connection of a host device. In other words, if the measured voltage at the P_IN contact reaches $V_{th}$ at or after time $T_1$, the accessory can enable the power limiting mode and provide the necessary power to the host device to enable initiation of communication with the accessory. The host device can then authenticate the accessory and subsequently the accessory can enable the bypass mode to provide appropriate power to the host device for operation or for charging a battery of the host device.

Figure 9:
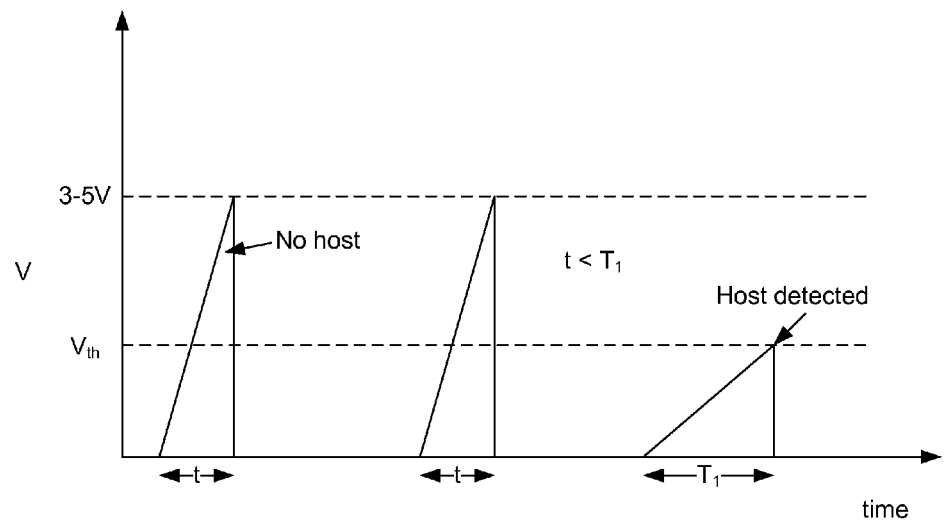
FIG. 9 shows voltage/current pulse outputted by the accessory and detection and non-detection of a host device according to an embodiment of the present invention.

FIG. 9 illustrates the pulsed voltage output in a connection detection mode according to an embodiment of the present invention. As illustrated in FIG. 9, if the measured voltage V equals to or exceeds $V_{th}$ in time t that is less than $T_1$, then the accessory can conclude that no host is connected. Whereas if the measured voltage V equals $V_{th}$ at or after $T_1$, then the accessory can conclude that a host device is connected to the accessory.

Figure 10:
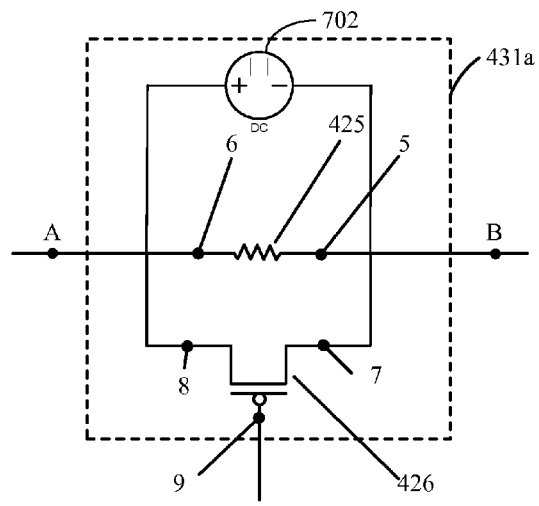
FIG. 10 is a schematic of an impedance altering circuitry for an accessory according to another embodiment of the present invention.

As described above, the connection detection current source 702 is disposed along the power path between the accessory and the host device. In some embodiments, current source can be connected in parallel to the impedance altering circuitry described in FIG. 6 above. Thus, in this embodiment, there are three power paths between the power source and the host device, via the accessory. FIG. 10 is a schematic that illustrates an impedance altering circuitry 431a according to another embodiment of the present invention. The difference between the embodiment of FIG. 6 and this embodiment is the addition of current source 702 in parallel with resistive element 425 and switch 426. In this embodiment, when the accessory is not connected to a host device the accessory operates in the connection detection mode in which the power path via current source 702 is enabled. When the accessory detects a host device, which has no power, connected to it (e.g., using the techniques described above), the accessory enables the power limiting mode and the power path via resistive element 425 is enabled. Once the accessory is authenticated by the host device, the accessory operates in the bypass mode and the power path via switch 426 is enabled.

Figure 11:
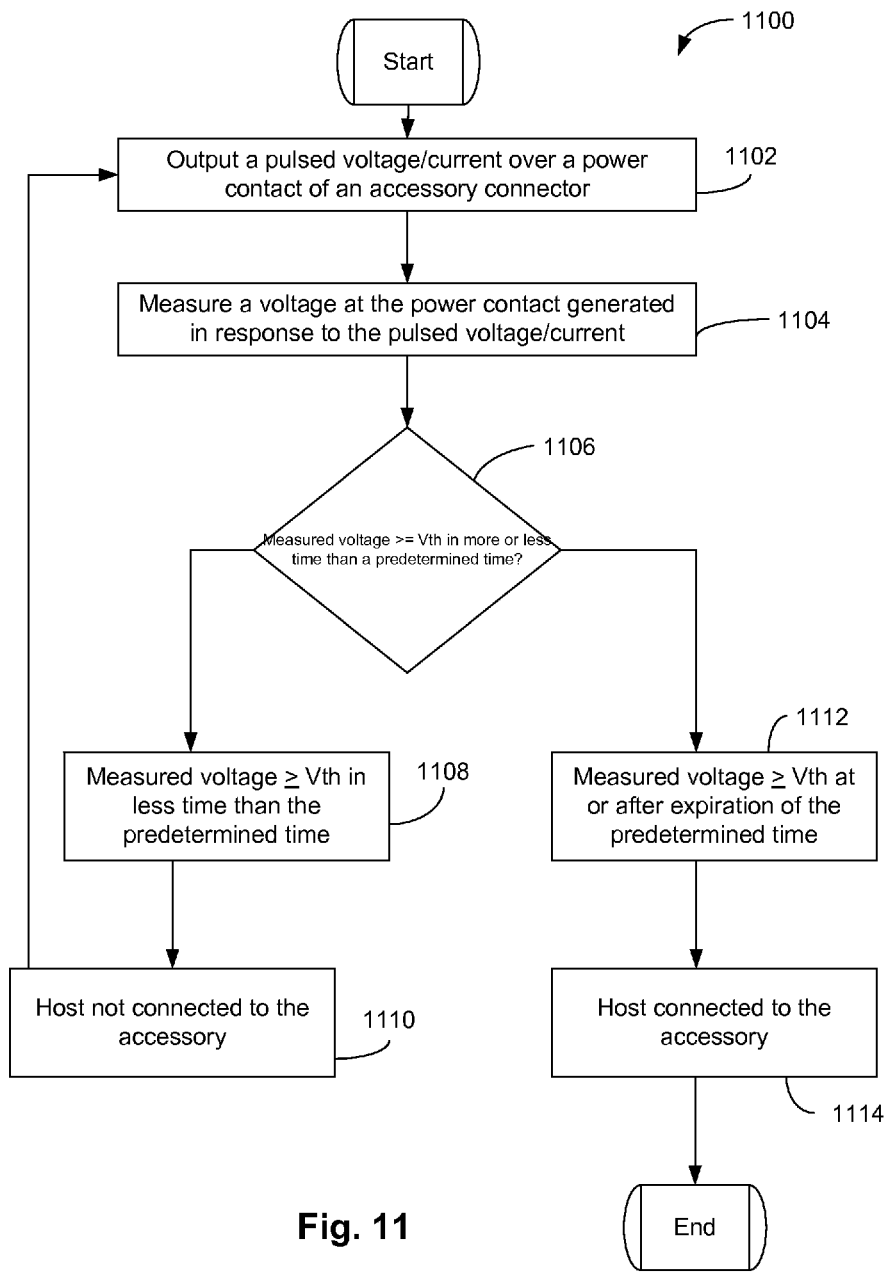
FIG. 11 is a flow diagram of a process for detecting connection of a host device to an accessory device according to an embodiment of the present invention.

FIG. 11 is a flow diagram of a process 1100 for detecting connection of a host device to an accessory device according to an embodiment of the present invention. Process 1100 may be performed, e.g., by accessory 104 of FIG. 1.

At step 1102 the accessory outputs a pulsed current over a power contact of an accessory-side connector. At step 1104 the accessory measures a voltage at the power output contact of the accessory-side connector. At step 1106 the accessory determines whether the measured voltage V is equal to greater than a reference voltage $V_{th}$ and whether the time taken by the voltage to reach $V_{th}$ is equal to or greater than a pre-determined time. If the accessory determines (step 1108) that the measured voltage reaches or exceeds $V_{th}$ within a time less than the pre-determined time, the accessory concludes that a host device is not connected to the accessory (step 1110) and process 1100 returns to step 1102.

However, if the accessory determines (step 1112) that the measure voltage V reached $V_{th}$ at or after the pre-determined time, then the accessory concludes that a host device is connected to the accessory (step 1114) and the process ends.

It should be appreciated that the specific steps illustrated in FIG. 11 provide a particular method of detecting connection of a host device according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
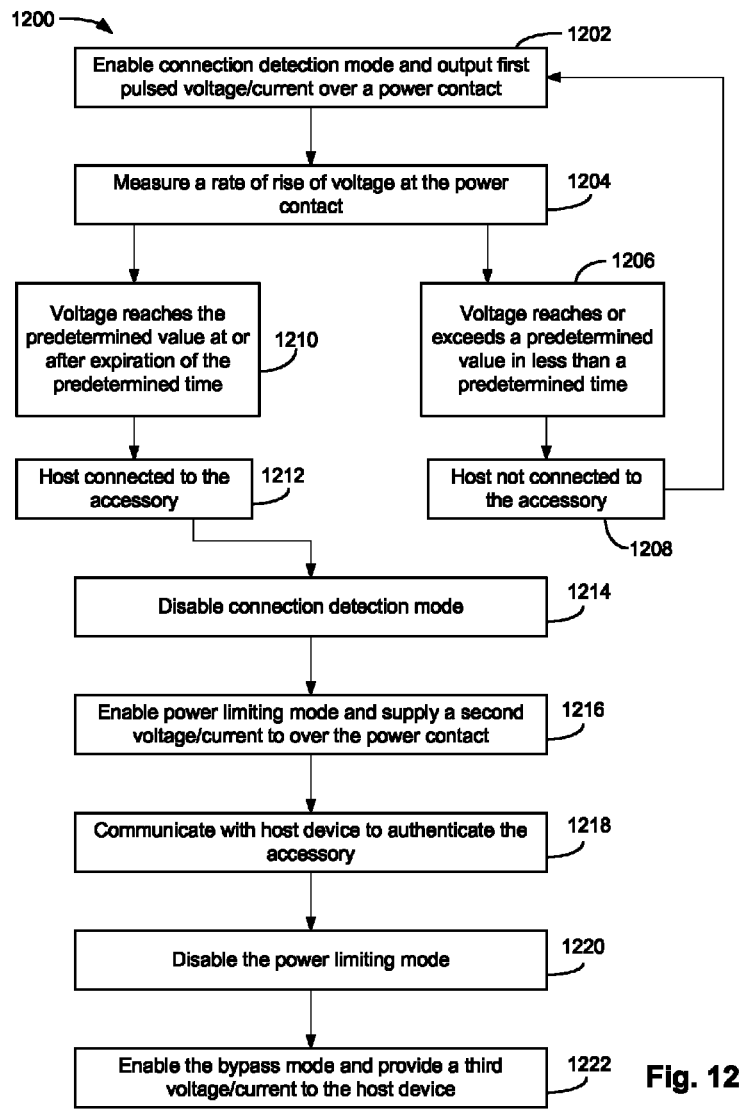
FIG. 12 is a flow diagram of a process for operating an accessory according to an embodiment of the present invention.

FIG. 12 is a flow diagram of a process 1200 for operating an accessory according to an embodiment of the present invention. Process 1200 may be performed, e.g., by accessory 104 of FIG. 1.

Initially the accessory may enable a connection detection mode (step 1202) in which the accessory outputs a current/voltage in a pulsed manner over a power contact of an accessory-side connector. Subsequent to outputting the voltage/current pulse, the accessory measures the voltage at the power contact (step 1204). If the measured voltage becomes equal to or exceeds a predetermined threshold voltage prior to expiration of a predetermined time (step 1206), the accessory concludes that there is no host device connected to it (step 1208). Thereafter the process returns to step 1202 where the accessory outputs the pulsed voltage/current based having a programmable duty cycle. If the measured voltage reaches the predetermined voltage value at or after expiration of the predetermined time (step 1210), the accessory concludes that a host device is connected to it (step 1212). Based on this conclusion, the accessory disables the connection detection mode (step 1214) and enables a power limiting mode in which the accessory supplies a higher constant current and voltage over the power contact (step 1216). This current/voltage is enough for the host device to start communicating with the accessory. Thereafter the accessory communicates with the host device to authentication the accessory (step 1218). Once the accessory is authenticated, the accessory disables the power limiting mode (step 1220) and enables a bypass mode (step 1222) in which the accessory provides the power needed for normal operation/charging of the host device.

It should be appreciated that the specific steps illustrated in FIG. 12 provide a particular method of operating an accessory according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method of charging a host electronic device having insufficient battery power to perform an authenticate process, the method comprising:
    performing a connection detection process by an accessory device to determine if the accessory is electrically connected to a host electronic device, the connection detection process including: outputting a first voltage over a contact in a connector of the accessory device; measuring, at the contact, a voltage as function of time; and determining whether the accessory is connected to the host electronic device based on the measured voltage and time;
    if the accessory device determines that the host electronic device is not connected to the accessory, terminating output of the first voltage over the contact and repeating the connection detection process; and
    if the accessory device determines that the host electronic device is connected to the accessory, initiating charging of the host electronic device to enable the host device to perform an authentication process to authenticate the accessory device.

2. The method of claim 1 wherein charging of the host electronic device comprises, by the accessory device:
    enabling a first power path between the accessory device and the host device and delivering a first current level to the host device over the first power path;
    thereafter, receiving and responding to a request from the host electronic device to authenticate the accessory device; and
    upon successful authentication of the accessory device, enabling a second power path between the accessory device and the host device and delivering a second current level higher than the first current level to the host device over the second power path.

3. The method of claim 2 wherein the first power path has a first resistance and the second power path has a second resistance lower than the first resistance.

4. The method of claim 2 wherein the accessory device determines whether the accessory is connected to the host electronic device based on whether the measured voltage at the contact reaches or exceeds a threshold voltage prior to, at, or after expiration of a predetermined time.

5. The method of claim 4, wherein the threshold voltage is between 0 and 1.8 volts.

6. The method of claim 4, wherein the predetermined time is between 1 µs and 100 µs.

7. The method of claim 4 wherein the threshold voltage is less than the first voltage and wherein the accessory determines that the accessory device is not connected to a host device if the measured voltage meets or exceeds the threshold voltage prior to expiration of the predetermined time and determines that the accessory is connected to a host device if the measured voltage meets or exceeds the threshold voltage at or after expiration of the predetermined time.

8. The method of claim 7 wherein when a host electronic device is not connected to the accessory device, performing a connection detection process comprises outputting a plurality of voltage pulses over the contact having a duty cycle of between 0.1 and 1.0 percent.

9. The method of claim 7 wherein when a host electronic device is not connected to the accessory device, performing a connection detection process comprises outputting a plurality of voltage pulses over the contact having a pulse duration of between 0.01 and 0.001 seconds.

10. The method of claim 1, wherein outputting a first voltage includes supplying a current between 10 µA and 1 mA over the contact less than the first current level.

11. The method of claim 1, wherein the host device has a dead battery or has no power.

12. An accessory device comprising:
a first connector including a plurality of contacts, wherein the first connector is configured to connect with a second connector of a host device;
detection circuitry coupled to the first connector; and
a current source coupled to a first contact in the plurality of contacts, wherein the accessory device is operable to perform a connection detection process to determine if the accessory is electrically connected to a host electronic device, the connection detection process including: outputting a first voltage over the first contact; measuring, using the detection circuitry, a rate of rise of voltage at the first contact; and determining whether the accessory is connected to the host electronic device based on whether the voltage measured at the first contact meets or exceeds a threshold voltage at or after expiration of a predetermined time;
if the accessory device determines that the host device is connected to the accessory device, initiate charging of the host electronic device to enable the host electronic device to perform an authentication process to authenticate the accessory device.

13. The accessory device of claim 12 wherein the first current is between 10 µA and 1 mA.

14. The accessory device of claim 12 wherein the first current is outputted as a series of pulses having a duty cycle of between 0.1% and 1%.

15. The accessory device of claim 12 wherein the threshold voltage is between 0 and 1.8 volts.

16. The accessory device of claim 12 wherein the predetermined time is between 1 µs and 100 µs.

17. The accessory device of claim 12 wherein the accessory device is further operable to:
prior to the authentication and after detection of the host device, enable a first power path between the accessory device and the host device and deliver a first current level to the host electronic device over the first power path, the first power path having a first resistance;
receive and respond to a request from the host device to send authentication information; and
upon authentication by the host device, enable a second power path between the host device and the accessory device and deliver a second current level higher than the first current level to the host electronic device over the second power path, the second power path having a second resistance lower than the first resistance.

18. The accessory device of claim 17 wherein the first and second current levels provided by the accessory via the first and second power paths, respectively, are each higher than a current supplied to the first contact during the connection detection process when the accessory device is connected to the host electronic device.

19. A non-transitory computer-readable storage device including a plurality of instructions, which when executed by a controller in an accessory device cause the accessory device to perform a method of determining if the accessory device is electrically connected to a host device having insufficient internal power to perform an authentication process, the plurality of instructions comprising:
instructions that cause the accessory device to perform a connection detection to determine if the accessory is electrically connected to a host electronic device, the connection detection process including: outputting a first voltage over a contact of an accessory connector of the accessory device; measuring a voltage at the contact as a function of time; and determining whether the voltage measured at the contact meets or exceeds a threshold voltage at or after expiration of a predetermined time;
if the accessory determines that the host electronic device is connected to the accessory, instructions that cause the accessory device to initiate charging of the host electronic device by enabling a first power path between the accessory device and the host device and delivering a first current level to the host device over the first power path; thereafter, receiving and responding to a request from the host electronic device to authenticate the accessory device to the host device; and upon successful authentication of the accesory device, enabling a second power path between the accessory device and the host electronic device and deliving a second current level higher than the first current level to the host device over the second power path.

20. The storage device of claim 19 wherein the threshold. voltage is between 0 volts and 1.8 volts.

21. The storage device of claim 19 wherein the predetermined time is between 1 µs and 100 µs.

22. The storage device of claim 19 wherein the first current is between 10 µA and 1 mA.

23. The storage device of claim 19 wherein the second current is smaller than the third current.

24. The storage device of claim 19 wherein the second current is about 15 mA.

* * * * *